Dec. 24, 1957 L. R. HUNTER ET AL 2,817,235
TEMPERATURE MEASURING SYSTEM FOR UNDERGROUND STORAGE CAVERN
Filed March 22, 1954 2 Sheets-Sheet 1
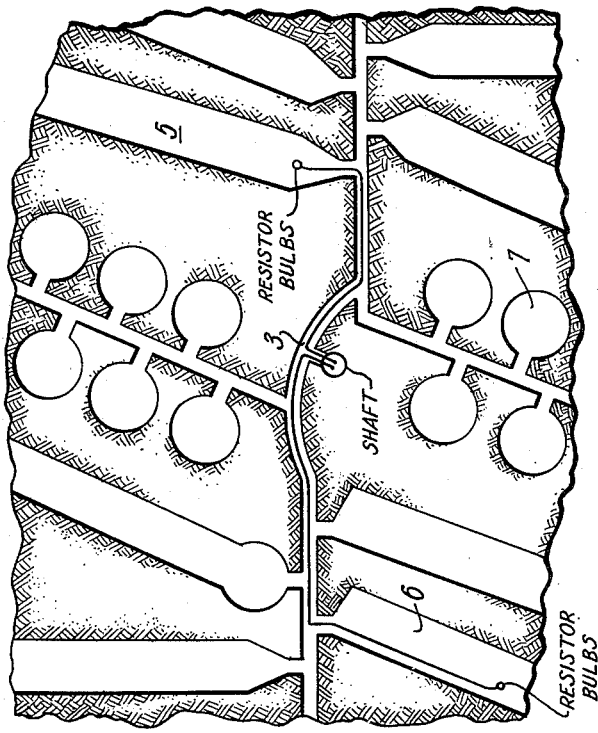
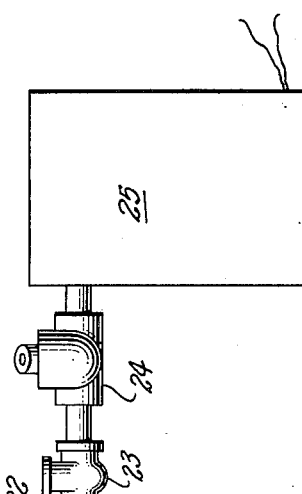
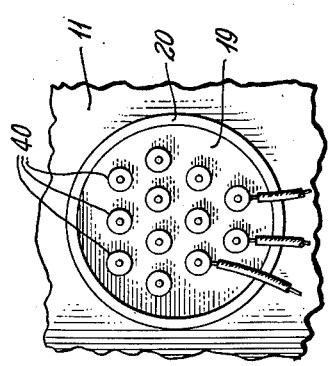
INVENTORS
L. R. Hunter and
BY L. P. Meade
Hudson & Young
ATTORNEYS

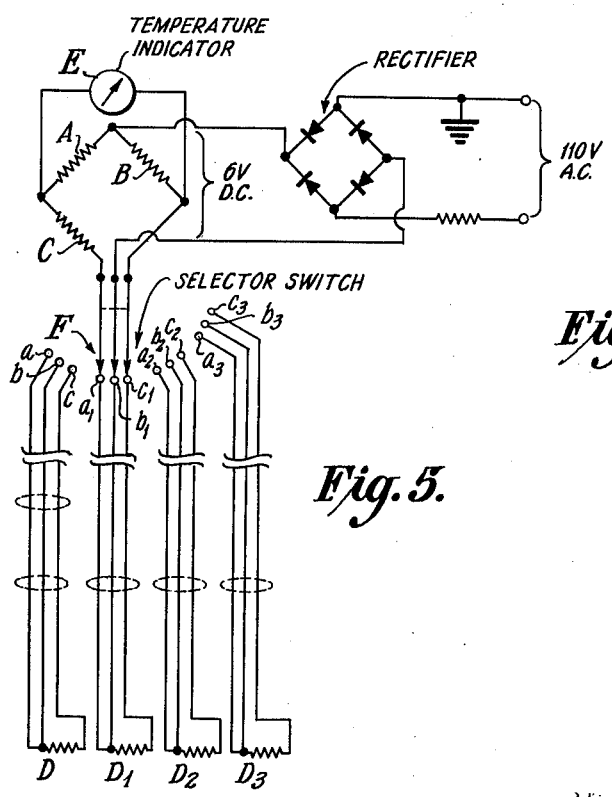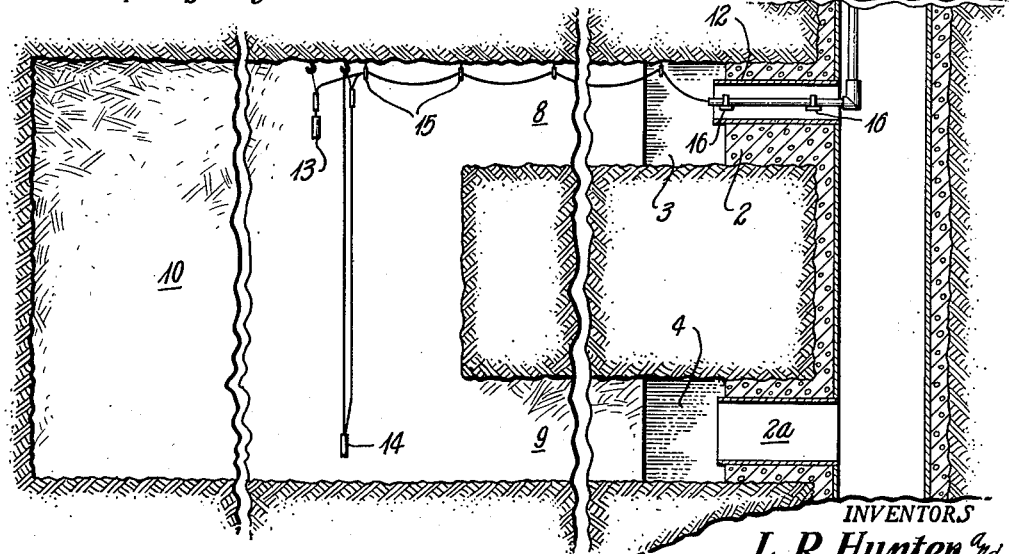

United States Patent Office 2,817,235
Patented Dec. 24, 1957

2,817,235

TEMPERATURE MEASURING SYSTEM FOR UNDERGROUND STORAGE CAVERN

Loy R. Hunter and Leonard P. Meade, Bartlesville, Okla., assignors to Phillips Petroleum Company, a corporation of Delaware Application March 22, 1954, Serial No. 417,758

7 Claims. (Cl. 73—342)

This invention relates to a means and method for measuring the temperature of an underground storage cavern. More specifically, it is directed to a method and means for determining the temperature at a plurality of points in a pressurized underground cavern wherein liquefied gases are stored.

Constantly expanding production of fluids for the industries of this country and elsewhere has created a definite problem in providing suitable storage facilities for these fluids. In the petroleum industries, in particular, the problem of storage of liquefied petroleum gas is presently an urgent one due to the cost of storage in surface equipment, such as steel tanks, and due to the massive construction required to withstand the vapor pressure of such liquids. Also adding to this problem of adequate storage facilities is the fact that many industries experience seasonal peak loads in the requirements for their fluid products and corresponding seasonal slack periods. These fluctuations in requirements require large storage facilities and the advantages of underground storage of fluids have lately come to the attention of the industry.

Underground storage caverns are generally formed in impermeable earth formations either by conventional mining methods or, in some cases, by dissolving out space with aqueous solvents in soluble formations, for example, in salt domes. The resulting caverns are less expensive to provide than would be an equal volume of orthodox surface storage space and have proven their value in the storage of LPG (liquid petroleum gas). In addition to LPG, other liquefied gases can be stored underground, e. g., ammonia.

In the operation of these underground storage caverns there are occasions when it is necessary to measure the temperature at various points in the caverns. When liquefied gas is being stored in a cavern, it may, for example, be necessary to measure the temperature at several points, both in the vapor phase and in the liquid phase of the stored product. This temperature information (also) is useful for pressure testing the cavern. For example, it may be desirable to test the cavern for leakage by inserting a gas under pressure. As long as the testing medium is changing temperature the pressure will also change, therefore, the temperature must reach equilibrium before a true pressure test can begin. In certain instances it may be desirable to purge the cavern with some inert gas and to pressure test with the product being stored. If this is done, it is possible to use the combined partial pressures of the two vapors or gases to reach the desired total pressure for the test. After a given amount of product has been injected into the cavern it is possible to determine the volume of the cavern through calculations involving the pressure-volume-temperature relationship. By measuring the temperature and partial pressure of the product in the cavern, it is a relatively simple calculation to determine its volume, since the volume occupied by a given mass of gas varies inversely with its pressure and directly with its temperature. Thus, one can calculate the amount of propane necessary to fill the cavern at the desired pressure. It is important that the proper amount of propane be added for if either too much or too little is added to the pressure buildup will not be as great and the resulting test pressure will be low.

The temperatures are also useful in determining heat transfer rates of the stored product and the surrounding earth and in maintaining a close check on conditions during filling, when the temperature and pressure tend to increase. If, e. g., the cavern is being filled with liquid which is cooler than the cavern walls, it is obvious that the liquid will expand on standing as it warms up to the ground temperature; hence, enough space can be saved to accommodate the calculated expansion.

According to the present invention the temperature in an underground storage cavern is accurately measured by the use of resistance thermometry. The basic principle of the resistance thermometer is the fact that the electrical resistance of a metallic conductor will increase as its temperature increases and that this temperature-resistance relationship will be sufficiently constant to permit the measurement of temperature by means of the known relation between temperature and resistance. The essential elements of resistance thermometry consist of a resistor properly mounted and protected, means for measuring variations in its resistance, and a relation between resistance and temperature. For general use a resistance thermometer consists of the resistor, means for supporting it, a protecting tube or sheath, connecting wires extending from the ends of the resistor to the outside of the enclosure, and a means of joining the connecting wires to flexible leads which make the connection to the resistance measuring apparatus. In special cases some of the elements may be omitted so that a thermometer designed to be built into other equipment may consist of merely a resistor, protecting tube, connecting leads, and terminals to which a connection may be made. As used in this specification the term "resistance thermometer" means the resistor itself and the elements permanently fastened to it, such as protecting tube and connecting leads.

In the present case this general type of device is used to measure the temperature in both the liquid and gaseous phases of a liquefied gas stored in a pressurized underground cavern. This requires not only accurate placement of the resistance thermometer, but also means for transmitting the measured resistance through the wall of a pressurized vessel to a resistance measuring apparatus at the surface of the ground. The use of resistance thermometry in underground storage caverns involves the problem of preventing leakage from the pressurized cavern to the atmosphere at the point where the impulse from the resistance thermometer is transmitted through the vessel walls. Otherwise, the loss of pressure at this point will lead to further vaporization of the liquefied gas and a steady loss of product. In the case of an inflammable gas, such as LPG, there is, in addition, a fire hazard involved in any such leakage. The present invention provides a safety feature for this possibility, a means of detecting escaping gas and of quickly shutting off the loss of pressure when it is first detected. The entire combination of means for measuring the cavern temperature without loss of pressure to the atmosphere is simple in design and operation and accurate in its results.

The principal object of this invention is to provide a means for determining aboveground the temperature in an underground storage cavern. A further object is to provide means for determining aboveground the temperature in both the liquid and gas phase of a liquefied gas stored in a pressurized underground cavern. An additional object is the provision of means comprising a resistance thermometer for determining at the exterior of a pressurized storage vessel the temperature at one or more points on the interior of said vessel. An added object is the provision of a method for determining, by resistance pyrometry, the temperature in an underground storage cavern.

The invention is further illustrated in the accompanying drawings.

Figure 1 is a plan view of an underground storage cavern showing the subterranean tunnels and rooms with the location of temperature measuring bulbs and connecting leads.

Figure 2 is a cross section of the shaft and a typical cavern showing the location of cable supports and showing one resistance bulb near the top of the cavern in the vapor space and a second bulb near the floor of the cavern in a space normally filled with liquid.

Figure 3 shows details of the nozzle through which the conductors are brought through the wall of the shaft liner at the surface of the ground.

Figure 4 shows an end view of the nozzle of Figure 3.

Figure 5 is a circuit diagram of a selector switch and a bridge circuit for measuring the temperature at the resistor.

Referring to Figures 1 and 2 of the drawing, reference numeral 1 shows a shaft 1 opening at 2 into a tunnel 3 which branches into a series of storage caverns. Some of these caverns, for example 5 and 6, are simply elongated dead-end tunnels about 20′ wide, 50′ high, and 175 to 200′ long; others are in the form of silos, as indicated at 7. Storage product is admitted to the system through a branch of the tunnel 3, not shown. A set of resistor bulbs are shown in caverns 5 and 6 with leads extending back to shaft 1.

Referring to Figure 2, a vapor pipe 12 connects shaft 1 with upper tunnel 3 and this, in turn, is connected with the upper portion of cavern 10 through channel 8. The lower portion of shaft 1 is connected to a lower tunnel 4 through branch line 2a; tunnel 4, in turn, connects with the lower portion of cavern 10 through channel 9. The two sets of tunnels are in approximate vertical alignment. Two resistor bulbs 13 and 14 are positioned in the upper and lower portions, respectively, of cavern 10, corresponding to the gaseous and liquid phases of the stored products. In the present case the resistor is enclosed in a bulb with conductors extending along the cavern roof and tunnel roof, through vapor pipe 12, and up the side of shaft 1 to the surface of the ground. A typical resistor bulb would be ½″ in diameter, 4″ long, of stainless steel construction. The resistor itself is a platinum resistance wire. The conductors consist of three wires in the form of a three-strand cable; these are suspended from the cavern roof by suitable insulators 15. The two sets of cables are enclosed in a conduit from about the point where they enter the vapor pipe 12 up to about the top of the shaft 1. This conduit is suitably supported from vapor pipe 12, e. g., by conduit clamps 16 welded at about five-foot intervals along the interior of the vapor pipe, and the portion extending up through the shaft is held up by conduit supports 17 welded, or otherwise suitably attached, to the shaft liner at spaced points along its length. The individual cables emerge from the conduit near the top of shaft 1, enough slack being left in the cables at the upper end of the shaft to enable their being pulled out through the shaft liner, if necessary. Each cable is attached to a screw-in, insulated connector 40 extending through the shaft liner; leads attached to the outer ends of the connectors extend through nozzle 20, plug valve 21, pipe 22, T-fitting 23, condulet 24, and junction box 25. These are detailed in Figures 3 and 4.

In Figure 3 a screw-in connector 40 is shown in place in a drilled plate 19 welded into a nozzle 20, which in turn, is welded at one end into the shaft liner 11. Plate 19 is fitted substantially flush with the shaft liner, as shown, and as many holes are drilled and tapped therein as there are conductors to be connected therethrough. For example, in the arrangement of Figure 1, where the temperature is being measured in two caverns employing two resistors in each, as illustrated in Figure 2, with three conductors leading from each resistor, it would be necessary, of course, to have twelve holes drilled and tapped in the plate to accommodate all conductors. Figure 4 illustrates a plate so drilled. The connectors 40 transmit the current from the conductors through the shaft liner 11 to leads 48 attached to the outer ends of the connectors 40. In this way the connectors make a gastight connection between the conductors from the resistor bulbs and the above-ground resistance measuring equipment. These connectors are simply externally threaded insulated bolts with a terminal at each end adapted for the attachment of leads thereto.

The safety feature is incorporated in the arrangement of plug valve 21, T-fitting 23, and condulet 24, all of which house leads 48. One arm of T-fitting 23 is open to the atmosphere. Condulet 24 is a receptacle in the pipeline filled with a sealing compound which blocks any gas which may have escaped around connectors 40 from entering junction box 25. Instead, it is liberated to the atmosphere from the open end of T-fitting 23. When gas is detected at this point, indicating an uncontrollable leak around the connectors, plug valve 21 can be closed, shearing off leads 48 and shutting in the pressure. Of course, the temperature measuring system will no longer be operable.

The leads from the junction box 25 are connected to a suitable measuring instrument to determine the change in resistance of the thermometer bulb. In resistance thermometry the simplest measuring instrument is a conventional Wheatstone bridge. An example of this is shown in Figure 5.

Figure 5 shows a typical deflection-type Wheatstone bridge with fixed resistances A, B, and C and a suitable galvanometer E. Resistor D in typical circuit $a-b-c$ is included as one of the four bridge circuit resistances. Any change in its temperature will unbalance the circuit and cause a deflection of the galvanometer. This deflection will be proportional to the change in the resistance of the bulb, which change is a function of the bulb temperature. The galvanometer is preferably calibrated into degrees of temperature so as to indicate directly the temperature change in the resistor D positioned in the cavern.

Associated with the temperature indicator is a four-point manual selector switch F. When it is desired to measure the temperature at a particular location, the switch is turned to a position corresponding to the bulb at that location. This completes a circuit between that bulb and the resistance measuring apparatus. Figure 5 shows the switch in a position which would connect resistor $D_1$ into the circuit to complete the Wheatstone bridge. By turning the switch to the proper setting one of the other resistances can be connected into the Wheatstone bridge in place of $D_1$. A dropping resistor and rectifier are shown in conjunction with a current source; these can be employed to step down and rectify a conventional 110 A. C. current to 6 volts D. C., which is sufficient to operate a Wheatstone bridge.

Since the principle of operation of the resistance thermometer is based on change in resistance, it is essential either that the change be all in the thermometer bulb or that a suitable compensation be made for changes in resistance in other parts of the circuit. If no compensation is used, the variation in the length of the conductors will affect the calibration of the temperature indicator, since the condictors form part of the resistance of the bulb arm of the circuit. In the present invention, errors due to changes in the resistance of the conductors are compensated for by the use of a three-wire lead line, as illustrated in Figure 5 and recited previously in the specification. With this arrangement equal lengths of lead line are thrown into each arm of the bridge and any variation of the resistance will result in equal changes in resistance in both arms. Hence, it is unnecessary to calibrate the instrument each time a different resistor bulb is switched on. Thus, the fact that the resistor bulbs in the cavern are located at different distances from the instrument will not affect its accuracy.

In place of the deflection-type of Wheatstone bridge illustrated in Figure 5, a balance type could also be employed.

Various changes could be made in the applications disclosed above without departing from the spirit of the invention. For example, instead of using a resistance pyrometer and a Wheatstone bridge circuit, one could use thermocouples; in this case the voltage would fluctuate with the temperature change at the thermocouple and could be indicated on a potentiometer. Any such modifications are within the purview of this invention.

This case is related to Serial No. 356,798, filed May 22, 1953, same assignee.

We claim:

1. In a pressurized underground storage system comprising a vertical shaft extending downwardly from the surface of the earth, a horizontal lower tunnel and a horizontal upper tunnel each having one end communicating with said shaft, said tunnels being in substantially vertical alignment, a plurality of storage caverns communicating with said tunnels, a tubular metal liner attached to the walls of said shaft, and means for sealing said shaft at the surface of the earth, electrically energized means for measuring the temperature in the upper and lower portions of at least one of said caverns comprising: resistors positioned in the upper and lower portions of said cavern, conductors leading from said resistors through the tunnels and shaft to the upper portion of the shaft, said conductors carrying an electrical current through said resistors, a cylindrical conduit, one end of which protrudes slightly through the shaft liner at a point near the top thereof, the other end of said conduit opening into a junction box, the major axis of the conduit being normal to the major axis of the shaft, a plate closing said protruding end of the conduit, electrical connectors extending through said plate from the inside of the shaft to the outer side thereof, the ensemble of plate, cylinder end, and connectors being so installed as to furnish a gas-tight plug in the liner, the upper ends of the conductors being attached to the connectors on the inside of the shaft, leads attached to the outer ends of said connectors, a valve, a vent, and a gastight plug in said conduit in that order, the leads extending through the conduit into the junction box, a second set of leads extending from the junction box to a resistance measuring apparatus, whereby the resistance measured at the resistor can be translated into the temperature at the resistor, and a source of electrical current for energizing said temperature measuring means.

2. In a pressurized underground storage system comprising a plurality of underground storage caverns, a common outlet shaft extending from about the lower level of said caverns to the surface of the earth, a plurality of tunnels connecting said caverns with said outlet shaft, a metal liner rigidly affixed to the walls of said shaft, and a cover over the top of said shaft, liquefied petroleum gas being stored in said cavern under pressure, the entire system of caverns, tunnels, and shaft being gastight, a temperature measuring system comprising an orifice in the upper portion of the shaft liner, an elongated conduit, one end of which is fitted into said orifice and the other end into a junction box, the major axis of the conduit and shaft being perpendicular to each other, a plate closing that end of the conduit which is fitted into the orifice, a plurality of insulated electrical connectors mounted in said plate, each connector extending through the plate and protruding from each side thereof in a manner designed to prevent the accompanying escape of gas from the cavern, a plurality of electrical resistors positioned in at least one of said caverns, said resistors being sufficient in number to contact both the liquid and the gaseous phase of the stored product, a first set of leads connecting each of said resistors with a set of connectors in said plate, each lead being attached to an individual connector on the inside of the shaft, a second set of leads within said conduit, each attached at one end to the outer end of one of said connectors and attached at the other end to a terminal in said junction box, a third set of leads connecting said terminals with a resistance measuring device, a selector switch electrically associated with said resistance measuring device and said third set of leads, a source of current which electrically energizes said combination of resistors, leads, and resistance measuring device, whereby any change in the electrical resistance of said resistors is indicated by said resistance measuring device, from which the temperature change of any resistor can be determined, and a safety device in said conduit between said plate and said junction box, said device including a vent for gases which may escape from the shaft into the conduit and a valve for shutting off the flow through the conduit of said gas when detected at said vent.

3. The system of claim 2 wherein the resistance measuring device is a Wheatstone bridge, the bridge circuit being complete when any one of the resistors is connected into said bridge.

4. In an underground storage system comprising a pressurized underground storage cavern, a shaft connecting said cavern with the surface of the earth, and a metal liner in said shaft, means for determining the temperature at spaced points in said cavern comprising electrical resistors positioned in said cavern at said spaced points, conductors extending from said resistors through said shaft to the upper portion thereof, insulated connectors extending through the liner wall at said upper portion in a manner designed to prevent pressure loss from said cavern, each of said conductors being attached to one of said connectors on the inside of the shaft, means electrically associated wtih said resistors for indicating the temperature at said resistors, leads connecting said temperature indicating means with said connectors outside said shaft, a conduit housing said leads and connectors outside said shaft forming a gas-tight seal with said liner, a vent in said conduit for venting gases escaping past said connectors and into said conduit, and a valve in said conduit between said vent and said connectors.

5. In a pressurized underground storage system wherein a vertical shaft extends into the earth, a horizontal lower tunnel and a horizontal upper tunnel connect with said shaft, said tunnels being in generally vertical alignment, a plurality of storage caverns branch from said tunnel and contain liquefied gas, the upper and lower portions of said caverns opening into the upper and lower tunnels respectively, and a tubular metal liner is affixed to the walls of said shaft, a temperature measuring apparatus comprising a conduit having one end protruding slightly into the upper portion of said metal liner, a junction box joining the other end of said conduit, a plate fitted into said protruding end, a plurality of insulated connectors so mounted in said plate as to prevent escape of gas at these points, the ends of said connectors protruding from the surface of the plate on each side, a resistance measuring device at the surface of the earth, a plurality of resistors positioned in at least one of said caverns, part of said resistors being in the liquid phase caverns, part of said resistors being in the liquid phase and the remainder in the gas phase of the stored product, electrical conductors extending through said upper tunnel and said shaft connecting said resistors with the aforesaid insulated connectors, leads attached to the outer ends of said insulated connectors and extending through the associated conduit and said junction box to said resistance measuring device, a source of electricity, the combination of resistors, resistance measuring apparatus, and associated connecting means being electrically energized by said source, whereby any change in the temperature of the resistors will result in a change in their resistance which in turn will be indicated by said resistance measuring apparatus, and a safety device incorporated into the conduit, said device comprising, in combination, a valve in the conduit between the plate and the junction box and a vent in the conduit between said valve and the junction box, whereby any gas escaping from the shaft into the conduit can be detected at said vent and by closing the valve can be shut off.

6. In a pressurized underground storage system wherein a vertical shaft extends into the earth, a horizontal lower tunnel and a horizontal upper tunnel connect with said shaft, said tunnels being in generally vertical alignment, a plurality of storage caverns branch from said tunnel and contain liquefied gas, the upper and lower portions of said caverns opening into the upper and lower tunnels respectively, and a tubular metal liner is affixed to the walls of said shaft, a temperature measuring apparatus comprising a conduit having one end protruding slightly into the upper portion of said metal liner, a junction box joining the other end of said conduit, a plate fitted into said protruding end, a plurality of insulated connectors so mounted in said plate as to prevent escape of gas at these points, the ends of said connectors protruding from the surface of the plate on each side, a resistance measuring device at the surface of the earth, a plurality of resistors positioned in at least one of said caverns, part of said resistors being in the liquid phase and the remainder in the gas phase of the stored product, electrical conductors extending through said upper tunnel and said shaft connecting said resistors with the aforesaid insulated connectors, leads attached to the outer ends of said insulated connectors and extending through the associated conduit and said junction box to said resistance measuring device, a source of electricity, the combination of resistors, resistance measuring apparatus, and associated connecting means being electrically energized by said source, whereby any change in the temperature of the resistors will result in a change in their resistance which in turn will be indicated by said resistance measuring apparatus, and a safety device in said conduit comprising: a gastight seal in said conduit to prevent gas which may have escaped from the shaft into the conduit from entering the junction box, an opening in the conduit between said seal and said shaft to allow venting of said gas into the atmosphere, and a valve in the conduit between said opening and shaft, said valve being operative to shut off the further flow of gas to said opening.

7. In an underground storage system comprising a pressurized underground storage cavern, a shaft connecting said cavern with the surface of the earth, and a metal liner in said shaft, means for determining the temperature at spaced points in said cavern comprising electrical temperature sensitive elements positioned in said cavern at said spaced points, conductors extending from said temperature sensitive elements through said shaft to the upper portion thereof, insulated connectors extending through the liner wall at said upper portion in a manner designed to prevent pressure loss from said cavern, each of said conductors being attached to one of said connectors on the inside of the shaft, means electrically associated with said temperature sensitive elements for indicating the temperature at said temperature sensitive elements, leads connecting said temperature indicating means with said connectors outside said shaft, a conduit housing said leads and connectors outside said shaft forming a gas-tight seal with said liner, a vent in said conduit for venting gases escaping past said connectors and into said conduit, and a valve in said conduit between said vent and said connectors.

References Cited in the file of this patent

UNITED STATES PATENTS

| | | |
|---|---|---|
| 1,224,385 | Kennedy | May 1, 1917 |
| 1,867,870 | Baker et al. | July 19, 1932 |
| 1,904,819 | Blodgett | Apr. 18, 1933 |
| 2,420,969 | Newell | May 20, 1947 |
| 2,456,499 | Fritzinger | Dec. 14, 1948 |
| 2,457,751 | Thompson | Dec. 28, 1948 |
| 2,508,588 | Waltman | May 23, 1950 |
| 2,558,580 | Pomykala | June 26, 1951 |
| 2,605,315 | Hargett | July 29, 1952 |
| 2,672,500 | Bondon | Mar. 16, 1954 |